US009616726B2

(12) United States Patent
Harla et al.

(10) Patent No.: US 9,616,726 B2
(45) Date of Patent: Apr. 11, 2017

(54) LEVELING VALVE FOR DISCHARGING AND SUPPLYING FLUID

(71) Applicant: WABCO Europe BVBA, Brussels (BE)

(72) Inventors: Krzysztof Harla, Wroclaw (PL); Michael Haverkamp, Hannover (DE); Agnieszka Leszczuk, Wroclaw (PL); Marek Repela, Wroclaw (PL)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 14/221,913

(22) Filed: Mar. 21, 2014

(65) Prior Publication Data

US 2014/0346748 A1    Nov. 27, 2014

(30) Foreign Application Priority Data

May 21, 2013    (EP) ..................................... 13168528

(51) Int. Cl.
| | |
|---|---|
| *B60G 11/27* | (2006.01) |
| *B60G 17/052* | (2006.01) |
| *F16K 3/08* | (2006.01) |
| *F16K 11/074* | (2006.01) |
| *F16K 11/10* | (2006.01) |

(52) U.S. Cl.
CPC .......... *B60G 11/27* (2013.01); *B60G 17/0525* (2013.01); *F16K 3/08* (2013.01);
(Continued)

(58) Field of Classification Search
CPC ...... B60G 11/26; B60G 11/27; B60G 17/048; B60G 17/0485; B60G 17/052;
(Continued)

(56) References Cited

U.S. PATENT DOCUMENTS 4,340,353 A * 7/1982 Mayer ........................... 425/548
4,391,579 A * 7/1983 Morrison ....................... 425/548
(Continued)

FOREIGN PATENT DOCUMENTS

| DE | 10 2011 116 597 A1 | 4/2013 |
|---|---|---|
| EP | 1533150 A2 | 5/2005 |
| WO | WO 2010/089089 A1 | 8/2010 |

OTHER PUBLICATIONS

Machine translation WO2010/089089 retrieved Jul. 21, 2015.*
WABCO levelling valve part Nos. 464 008 0040 and 464 002 600 0 from http://inform.wabco-auto.com/intl/en/index.html.

*Primary Examiner* — Barry Gooden, Jr.
(74) *Attorney, Agent, or Firm* — Leydig, Voit & Mayer, Ltd.

(57) ABSTRACT

A leveling valve for discharging and supplying air from and to a plurality of utilization elements comprises a valve disc arrangement configured to direct air between a source of pressurized air, an exhaust port, and the utilization elements. The valve disc arrangement comprises a first and a second valve disc, which are rotatable with respect to each other such that the valve is switchable between multiple switching positions, and, in some switching positions, either the source of pressurized air or the exhaust port are in fluid communication with the utilization elements. The valve discs provide a stepped increase in flow cross-section in a respective flow path to or from the utilization elements. The stepped increase is dependent on the angle of rotation between the valve discs.

27 Claims, 7 Drawing Sheets

(52) U.S. Cl.
CPC ........ *F16K 11/074* (2013.01); *F16K 11/0743* (2013.01); *F16K 11/10* (2013.01); *B60G 2202/412* (2013.01); *B60G 2202/415* (2013.01); *B60G 2500/202* (2013.01); *B60G 2500/204* (2013.01); *Y10T 137/86638* (2015.04)

(58) Field of Classification Search
CPC ............ B60G 17/0521; B60G 17/0523; B60G 17/0525; B60G 17/056; B60G 17/0565; B60G 2202/1522; B60G 2202/415; B60G 2500/202; B60G 2500/204
See application file for complete search history.

(56) References Cited

U.S. PATENT DOCUMENTS

| | | | |
|---|---|---|---|
| RE32,041 E * | 11/1985 | Heckmann et al. ....... | 137/454.2 |
| 5,934,320 A * | 8/1999 | O'Reilly et al. ......... | 137/625.21 |
| 7,192,033 B2 * | 3/2007 | Bolt et al. ................ | 280/5.514 |
| 7,204,478 B2 * | 4/2007 | Plath ........................ | 267/64.28 |
| 7,503,902 B2 * | 3/2009 | Jensen et al. ............. | 604/6.1 |
| 2003/0038412 A1 * | 2/2003 | Plath ........................ | 267/64.16 |
| 2004/0120619 A1 * | 6/2004 | Chai ......................... | 384/420 |
| 2004/0201195 A1 * | 10/2004 | Plath .................. | F15B 13/0406 280/124.16 |
| 2006/0175775 A1 * | 8/2006 | Bolt et al. ................. | 280/5.514 |
| 2008/0217815 A1 * | 9/2008 | Akopyan ................... | 264/314 |
| 2008/0252025 A1 * | 10/2008 | Plath ........................ | 280/5.514 |
| 2014/0144526 A1 * | 5/2014 | Russell ..................... | 137/512.2 |
| 2014/0265172 A1 * | 9/2014 | Koelzer .................... | 280/5.514 |
| 2014/0346748 A1 * | 11/2014 | Harla et al. .............. | 280/124.16 |
| 2015/0273972 A1 * | 10/2015 | Plath .................. | B60G 17/019 701/37 |

* cited by examiner

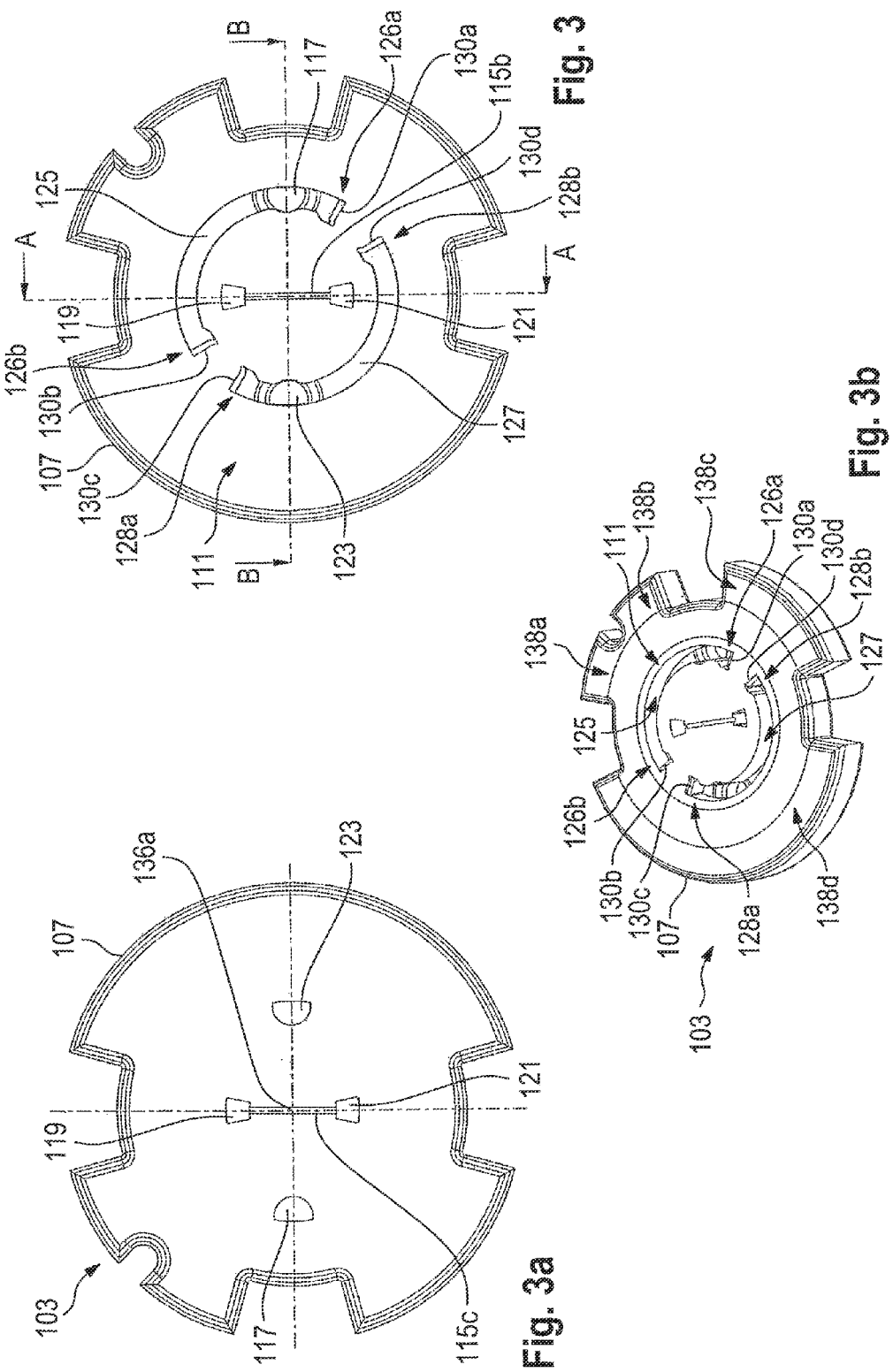

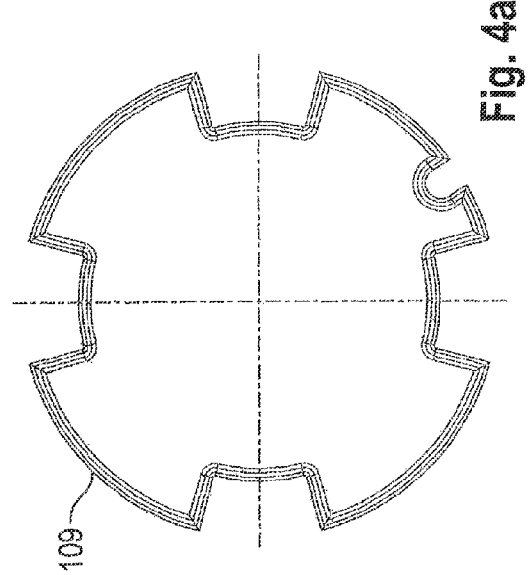
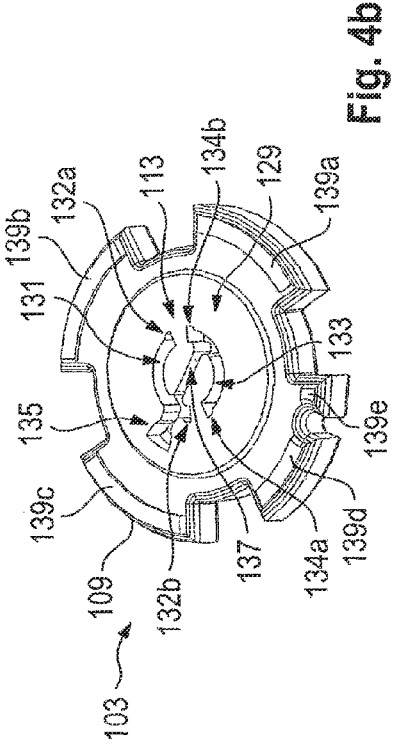
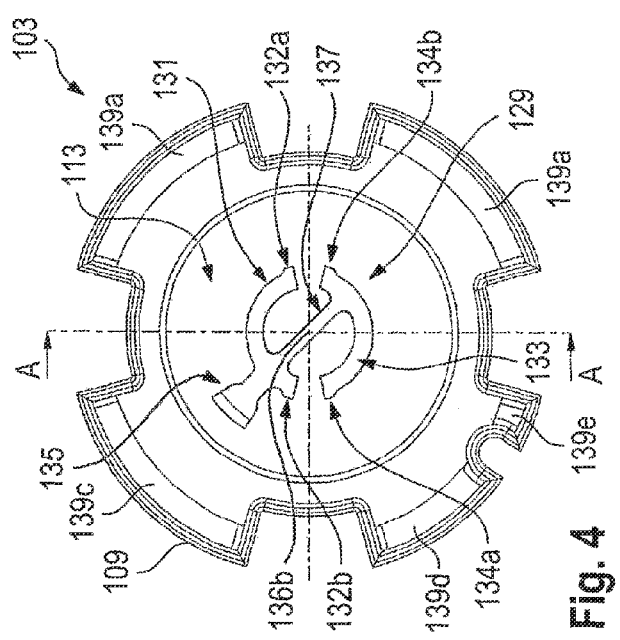

LEVELING VALVE FOR DISCHARGING AND SUPPLYING FLUID

CROSS-REFERENCE TO RELATED APPLICATION

This application claims the benefit of EP 13168528 filed on May 21, 2013, the disclosure of which is hereby incorporated herein by reference in its entirety.

FIELD OF THE INVENTION

The present invention generally relates to a leveling valve for discharging and supplying air from and to a plurality of utilization elements, such as pneumatic suspension bellows, the valve comprising a valve disc arrangement for directing air between a source of pressurized fluid, an exhaust port, and the utilization elements.

BACKGROUND OF THE INVENTION

A leveling valve of the general type under consideration is described in WO 2010/089089, Leveling valves are commonly used to regulate the vertical clearance of a vehicle such as a truck or other utility vehicle with respect to ground level. Depending on the load situation of the vehicle or depending upon dynamic forces acting on the utilization elements such as pneumatic suspension bellows of a vehicle, it is, in certain situations, necessary to increase or decrease the suspension level of the utilization elements. This is achieved by switching the leveling valve, in particular the valve disc arrangement, from its neutral position to either an "exhaust" switching position or an "air supply" switching position. Depending on the switching position, air will be exhausted from the utilization elements into the atmosphere, or will be supplied to the utilization elements from a source of pressurized air.

The known leveling valve described in WO 2010/089089 focuses on possible ways of decreasing the number of sealing elements used inside a valve by making a non-rotatable valve disc axially movable inside a valve housing, wherein the two valve discs are pressed against each other by pressure prevailing in either a line connected to the source of pressurized air or in a line connected to the utilization elements.

In practice, it is often necessary to regulate the level of the utilization elements very quickly. As a consequence, air has to be moved with high flow rates from the utilization elements towards the atmosphere or from the source of pressurized air into the utilization elements through the leveling valve. In order to achieve this, the flow paths inside the valve need to be dimensioned accordingly. There are, however, limits to the dimensioning of the flow paths as the entire leveling valve must not exceed. predetermined total dimensions in order to be practically usable on vehicles. In conventional valve systems, very small flow cross-sections inside the valve flow paths can lead to insufficient and slow reactivity when switching the valve and pushing air through the valve.

A further problem commonly found with pneumatic valves is the acoustic noise emitted when switching and pushing large amounts of air at high pressures through the valve.

SUMMARY OF THE INVENTION

Generally speaking, it is an object of the present invention to provide a leveling valve with improved functionality that overcomes drawbacks of conventional constructions. In particular, it is an object of the invention to provide a leveling valve with improved reactivity when switched. Furthermore, it is an object of the invention to provide a leveling valve that provides improved functionality while at the same time emitting as little acoustic noise as possible.

The present invention includes a valve disc arrangement for directing air between a source of pressurized fluid, an exhaust port, and the utilization elements comprising a first and second valve disc. The first and second valve discs are substantially concentric to each other, contacting each other along respective contact surfaces, and are rotatable with respect to each other such that the valve disc arrangement is switchable between multiple switching positions. At least one of the switching positions is a neutral position wherein fluid communication between the utilization elements and both the source of pressurized fluid and the exhaust port is blocked. In the other switching positions, either the source of pressurized air or the exhaust port is in fluid communication with the utilization elements.

According to one embodiment, in the leveling valve, the valve discs—when switched away from the neutral position—are adapted to provide a stepped increase in flow cross-section in a respective flow path between either the source of pressurized air or the exhaust port and the utilization elements. The stepped increase is dependent on the angle of rotation between the valve discs.

Preferably, the increase in flow cross-section is linked to the increasing angle of rotation between the valve discs such that an increased angle of rotation also leads to an increased flow cross-section in the respective flow path between either the source of pressurized fluid and the utilization elements, or between the exhaust port and the utilization elements, depending on the switching position of the valve disc arrangement.

The stepped increase can be achieved by providing a sudden and steep increase in flow cross-section at very low rotation angles away from the neutral position, followed by a comparatively shallow increase at higher rotation angles. A combination of these two features is salutary. Namely, the steep increase at very low rotation angles provides good reactivity of the valve because immediately upon switching from the neutral position to one of the flow positions, significant amounts of pressurized fluid are allowed to pass by a flow cross-section such that the level of the utilization element can quickly be regulated. The comparatively shallow increase after the first few degrees of rotation achieves the additional salutary effect of limiting acoustic noise.

In one embodiment, the stepped increase in flow cross-section comprises a first section (A) corresponding to a first increase ratio, and a second section (B) corresponding to a second increase ratio different from the first ratio, preferably lower than the first increase ratio. The stepped increase in flow cross-section can also comprise a third section (C) corresponding to a third increase ratio different from the second ratio, preferably higher than the second increase ratio.

Preferably, the neutral position of the valve disc arrangement encompasses only a small angular range of the leveling valve. The neutral position can extend for about ±1°-3° about a zero line, preferably about ±1.5° about the zero line. Outside of this so-called "dead band" for the neutral position, it is preferred that the first section (A), which features the steep increase of flow cross-section, is allocated an angular range of about ±4°-10° about the zero line.

In a further embodiment, a progressive increase in flow cross-section is provided from the second section (B)

towards the third section (C) along with a substantially linear increase in flow cross-section in section (C) towards a full opening of the flow cross-section (section D). Preferably, the full channel opening is achieved at about +20° from the zero line or at greater angles.

The aforementioned angular ranges are mentioned with "±" in order to indicate that, in one direction from the zero line, there will be one or more switching positions for exhausting air from the utilization elements, whereas in the respective other direction from the zero line, there will be one or more switching positions for supplying air to the utilization elements.

According to another embodiment, at least one of the flow paths comprises a throttle, the throttle being integrated in the valve disc arrangement, or alternatively being integrated into a housing of the leveling valve. According to this embodiment featuring an integrated throttle inside the valve disc arrangement, there is provided a leveling valve for discharging and supplying air from and to one or more utilization elements, in particular a plurality of pneumatic suspension bellows, comprising a valve disc arrangement for directing air between a source of pressurized air, an exhaust port, and the utilization elements. The valve disc arrangement comprises a first and second valve disc contacting each other along respective contact surfaces, the first and second valve discs being rotatable with respect to each other such that the valve is switchable between multiple switching positions, wherein each switching position corresponds to a distinct flow path, characterized in that at least one of the flow paths comprises a throttle, the throttle being integrated in the valve disc arrangement.

A particular advantage of the throttle according to this embodiment is that no extra part is required externally to the leveling valve for providing a throttle function. This increases the versatility of the valve and lowers the cost of implementing throttled leveling in vehicles.

The integrated throttle affords, the opportunity to conduct pressure equalization between the utilization elements controlled with the leveling valve according to the invention. The throttle at the same time enables air flow between the utilization elements and also limits the maximum flow rate due to the small throttle diameter. Accordingly, pressure equalization happens slowly such that the vehicle dynamic, whenever utilization elements such as pneumatic suspension bellows are concerned, is not negatively impacted. The pressure equalization should beneficially be minimized in driving situations where one utilization element is subjected to higher load for an extended period of time, such as is the case in long curves at higher speeds for trucks.

In yet another embodiment, the first valve disc comprises a first air passage for connection to a source of pressurized air, a second air passage for connection to a first utilization element, a third air passage for connection to a second utilization element, and a fourth air passage for connection to an air exhaust.

Preferably, the throttle is formed as an air channel connecting the second and third air passages. The throttle can be formed as a recess in the contact surface face of the first valve disc facing the second valve disc. Alternatively, the throttle can be formed as a recess in the contact surface of the second valve disc facing the first valve disc. As a further alternative, the throttle can be formed as a recess in a surface of the first valve disc opposite, i.e., facing away, from the contact surface with the second valve disc. By providing the throttle in this manner, it is possible to create the throttle element along with the creation of the air passages in the first valve disc. This may be achieved by conventional manufacturing techniques, which depend on the material of the valve being employed. In a preferred embodiment, the first and second valve discs are made from a ceramic material.

In yet another alternative embodiment, the throttle can be formed as a flow passage, e.g., a bore, inside the housing of the leveling valve.

According to a further embodiment, the first air passage and the fourth air passage comprise arcuate, in particular circular, first and second flow portions. Preferably, the first and second flow portions are respectively formed as a recess in the contact surface of the first valve disc facing the second valve disc. Ideally, both the first and second arcuate flow portions are located on the same radius with respect to the center of rotation of the valve discs. Advantageously, for both air flow modes (exhaust mode and supply mode), the same angle of rotation of the valve discs relative to each other, i.e., the same lever movement in cases where a lever is used for rotating the valve discs, will lead to the exact same flow channel opening, i.e., flow resistance for both air flow modes. The increased symmetry of operation makes it possible to design the leveling valve and, in particular, the valve discs to be even more compact since both channels may be made equally small/large. If the flow portions were not located on the same radius but instead on different radii, the flow cross-section for one of the two flow portions would have to be enlarged asymmetrically, which, in turn, would lead to a larger outer diameter of the valve disc.

According to another embodiment, the second valve disc comprises a manifold. That manifold is preferably formed as a recess on the contact surface of the second valve disc facing the first valve disc. Ideally, depending on the switching position the manifold is in fluid communication with none or at least one of the first, second, third and fourth air passage, which are respectively preferably provided in the first valve disc. The advantage of forming the manifold in the way described hereinabove is the same as with respect to the flow portions and air passages in the first valve disc. Therefore, reference is made to the comments hereinabove.

Preferably, in a first switching position the manifold connects the first air passage to the second and third air passages, in a second switching position the manifold connects the fourth air passage to the second and third air passage, and in a third switching position, the manifold is in the neutral position, connecting neither first nor fourth air passages to the second and third air passages.

In one embodiment, the manifold comprises a first and a second arcuate, in particular circular, manifold flow portion, the first and second manifold flow portions respectively being formed as a recess on the contact surface of the second valve disc facing the first valve disc, and the first and second manifold flow portions being arranged—depending on the switching position—for communication with the second and third air passages, which preferably are provided on the first valve disc.

Also, the first and second arcuate flow portions of the manifold can be arranged on the same radius in order to provide for symmetrical flow behavior regardless of the chosen flow mode (exhaust or supply).

Preferably, the manifold comprises at least one of: (i) an outer inlet/outlet flow portion in fluid communication with the first and second manifold flow portions, the outer inlet/outlet flow portion being formed as a recess in the contact surface of the second valve disc facing the first valve disc; and arranged—depending on the switching position—for communication with the first air passage or with the fourth air passage; and (ii) a first and second inner inlet/outlet flow portion located on each end of the first and second manifold flow portions, the first and second inlet/outlet flow portion being formed as a recess in the contact surface of the second valve disc facing the first valve disc, and arranged—depending on the switching position—for communication with the second and third air passages.

In a further embodiment of the leveling valve, the outer inlet/outlet flow portion has across-sectional shape that is congruent with a corresponding cross-sectional shape of the first and second end portion provided on bath ends of the flow portions of the first and fourth air passages. Also, alternatively or additionally, each of the first and second inner inlet/outlet flow portion preferably has a cross-sectional shape that is congruent with a corresponding cross-sectional shape of the second and third air passages. Here, congruency can mean that the width of the respective flow portions in a radial direction is identical in both respective flow portions. The edges of the outer and inner flow portions and, correspondingly, the edges of the first and second flow portions of the first and fourth air passages, and the first and second manifold flow portions are each shaped and oriented such that, upon rotation of the valve discs relative to each other, the respective flow portions are brought into fluid communication over their entire width immediately, leading to a steep first increase in flow cross-section.

According to another embodiment of the leveling valve, at least one, preferably each, of the end portions of the outer inlet/outlet flow portion comprises a step, rounded edge, or chamfer. The element is preferably oriented to provide a retarded increase in flow cross-section as a transition from the first section (A) to the second section (B) when switching the valve. By partially reducing the depth of the respective flow portion over the length of the chamfer, the initial steep increase is "slowed," leading to the shallower second section increase.

Preferably, in a fourth switching position, the manifold connects the first air passage to the second and third air passages, wherein the flow cross-section established between the outer inlet/outlet flow portion of the manifold and the first flow portion (of the first air passage) is smaller than in the first switching position, and in a fifth switching position, the manifold connects the fourth air passage to the second and third air passage wherein the flow cross-section established between the outer inlet/outlet flow portion and the second flow portion (of the fourth air passage) is smaller than in the second switching position. When switching from the neutral position in either the exhaust or supply direction, there are now more switching positions; throttled and a non-throttled switching positions. All this is possible without providing external parts.

In a further embodiment of the leveling valve, the first valve disc and the second valve disc are arranged concentrically with respect to each other. Preferably, the second valve disc is rotatably mounted in a valve housing, and rotatable between the plurality of switching positions, wherein the first valve is fixedly mounted in the housing, or vice-versa. If only one of the two valve discs is rotatable, overall construction of the leveling valve can be simplified and made more reliable.

In another embodiment of the leveling valve, the manifold is formed and arranged in the second valve disc, and the first, second, third, and fourth air passages are formed and arranged in the first valve discs such that an identical number of switching positions is provided by the valve when rotating the second valve disc by 180° with respect to the first valve disc. Preferably, this is achieved by arranging the first and fourth, and the second and third air passages, respectively, around a rotational center axis of the first valve disc.

Ideally, the first and fourth, and the second and third air passages are arranged point-symmetrically around the rotational center axis of the first valve disc, wherein the rotational center axis is perpendicular to the contact surface of the first valve disc. Further, the arcuate manifold flow portions are preferably arranged symmetrically around a rotational center axis of the second valve disc. Still further, the crosslink flow portion is preferably arranged radially with respect to the rotational center axis of the second valve disc.

According to yet another embodiment of the leveling valve, at least one, preferably each, of the first and second valve discs comprises one or more support ridges abutting against the contact surface of the respective other valve disc when the valve is assembled, wherein the support ridges are located in a radially peripheral region of the respective valve discs surface. The one or more support ridges have a beneficial effect insofar as the two valve discs are supported against each other in more stable fashion. Due to a maximized (radial) distance between the support ridges and the rotational center axis of the valve discs, any normal force or level force can be better absorbed by the valve discs with respect to the valve housing. Accordingly, higher force can be imposed on the valve discs, leading to improved sealing between the valve discs.

Another object of the present invention is to provide an air suspension system for use in a vehicle comprising a plurality of utilization elements, in particular suspension bellows, a leveling valve for discharging and supplying air from and to the utilization elements, and a source of pressurized air connected to a first air passage of the leveling valve, wherein the leveling valve is a leveling valve according to any one of the embodiments described herein.

A further object of the invention is to provide a vehicle, e.g., a truck, comprising a plurality of tires mounted on a vehicle axle, a superstructure, and an air suspension system coupling the axle to the superstructure, wherein the air suspension system is an inventive air suspension system as described herein.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

For a more complete understanding of the invention, the invention will now be described with reference to the accompanying drawings, in which:

FIG. 3 is a detailed side view of the valve disc arrangement shown in FIGS. 2, 2a, 2b;

FIGS. 3a, 3b are further side views of the valve disc arrangement shown in FIG. 3;

FIG. 4 is a further detailed side view of the valve disc arrangement shown in FIG. 2;

FIGS. 4a, 4b are further side views of the valve disc arrangement shown in FIG. 4;

Figure 1:
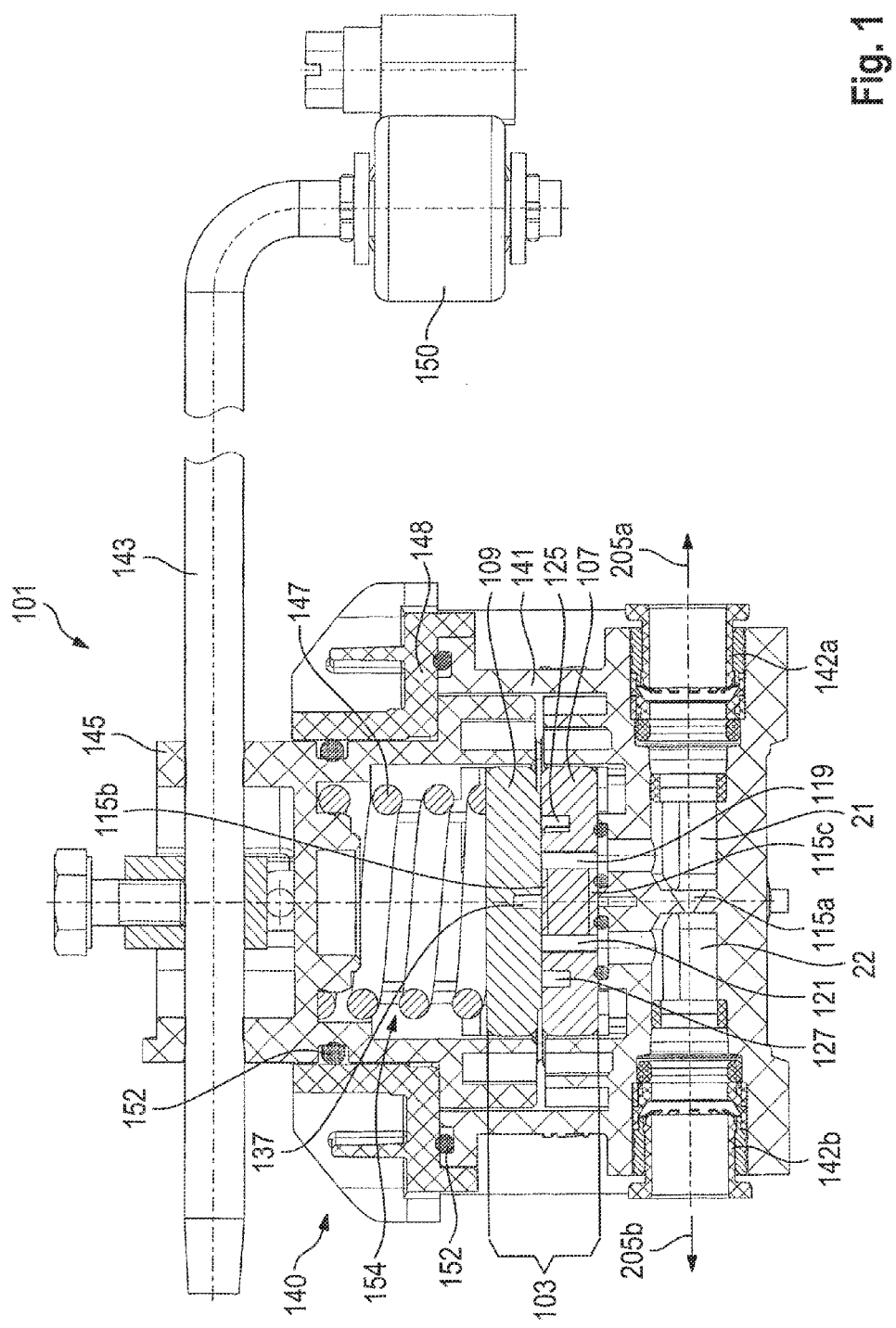
FIG. 1 is a cross-sectional view of a leveling valve according to an exemplary embodiment of the present invention.

LIST OF REFERENCE CHARACTERS 1 fluid (air) supply port
21 first fluid (air) channel
22 second fluid (air) channel
3 fluid (air) exhaust port
101 leveling valve
103 disc valve arrangement
105a-e switching positions
105a second switching position (exhaust)
105b fifth switching position (exhaust "throttled")
105c neutral (third) switching position
105d fourth switching position (supply "throttled")
105e first switching position (supply)
107 first valve disc
109 second valve disc
111 contact surface of first valve disc
113 contact surface of second valve disc
115a-c throttle
117 first air passage (for connection to source of pressurized air)
119 second air passage (for connection to first utilization element)
121 third air passage (for connection to second utilization element)
123 fourth air passage (for connection to air exhaust)
125 first flow portion (of first air passage)
126a,b first end portion (of flow portion of first air passage)
127 second flow portion (of fourth air passage)
128a,b second end portion (of flow portion of fourth air passage)
130a-d step, rounded edge or chamfer
131 first manifold flow portion
132a,b first inner inlet/outlet flow portion
133 second manifold flow portion
134a,b second inner inlet/outlet flow portion
135 outer inlet/outlet flow portion
136a rotational center axis of first valve disc
136b rotational center axis of second valve disc
137 crosslink flow portion
138a-d first support ridge
139a-e second support ridge
140 housing
141 base body
142a,b,c connection ports
143 lever
145 rotatable housing portion
147 spring
148 housing lid
150 coupler
152 dirt seal
154 first air plenum
156 second air plenum
158 air flap
200 air suspension system
205a,b utilization elements
207 source of pressurized air
300 vehicle
301 vehicle axle
303 tire
305 superstructure
S supply side
E exhaust side
N neutral section
A first flow section
B second flow section
C third flow section
D full flow channel opening

DETAILED DESCRIPTION OF THE PREFERRED EMBODIMENTS

Figure 1A:
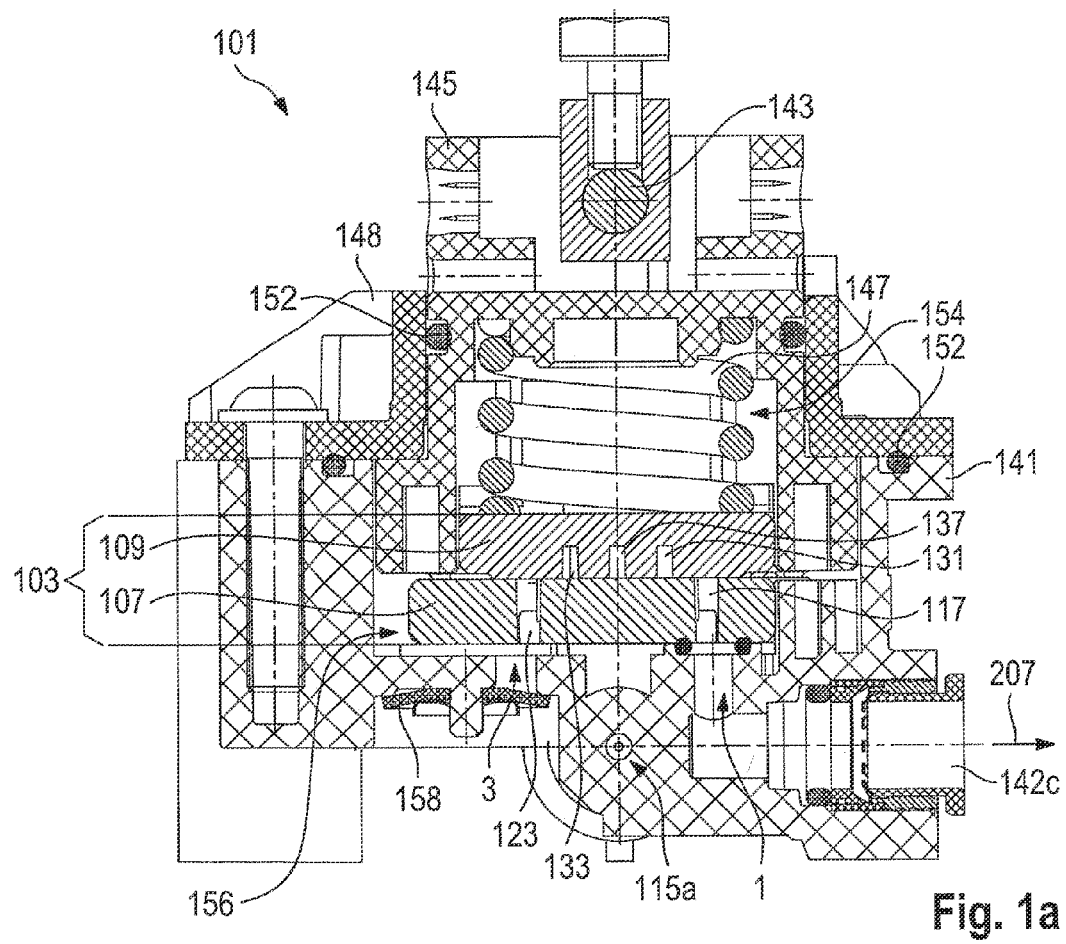
FIG. 1a is an alternative cross-sectional view of the leveling valve shown in FIG. 1.

A leveling valve 101 in accordance with a preferred embodiment of the invention is depicted in FIG. 1 and in FIG. 1a. The leveling valve 101 comprises a valve disc arrangement 103 for directing air between a plurality of utilization elements 205a,b and either a source 207 of pressurized air or an exhaust port 3. The valve disc arrangement 103 comprises a first valve disc 107 and a second valve disc 109. The first and second valve discs 107, 109 of the valve disc arrangement 103 comprise respective flow portions forming flow paths for guiding the air through the valve. This will be discussed in greater detail hereinafter in connection with FIGS. 2-5.

The first and second valve discs 107, 109 are rotatable with respect to each other. In the embodiment of FIG. 1, the first valve disc 107 is mounted to be stationary inside a housing 140 of the leveling valve 101. The second valve disc 109 is mounted to be rotatable inside the housing 140. The housing 140 of the leveling valve 101 comprises a base body 141. The first valve disc 107 is mounted non-rotatably inside the base body 141. The housing 140 further comprises a rotatable housing part 145 fastened to the base body 141 by way of a housing lid 148 and extending into the base body 141. Inside a first air plenum 154 formed between the rotatable housing part 145 and the base, body 141, a resilient element, for example in the form of a spring 147, is located and effective to push the second valve disc 109 towards the first valve disc 107 in order to establish a sealing, preferably air-tight, relationship between the valve discs 107, 109 of the valve disc arrangement 103 and the housing, in particular with respect to the base body 141 of the housing 140.

Figure 6:
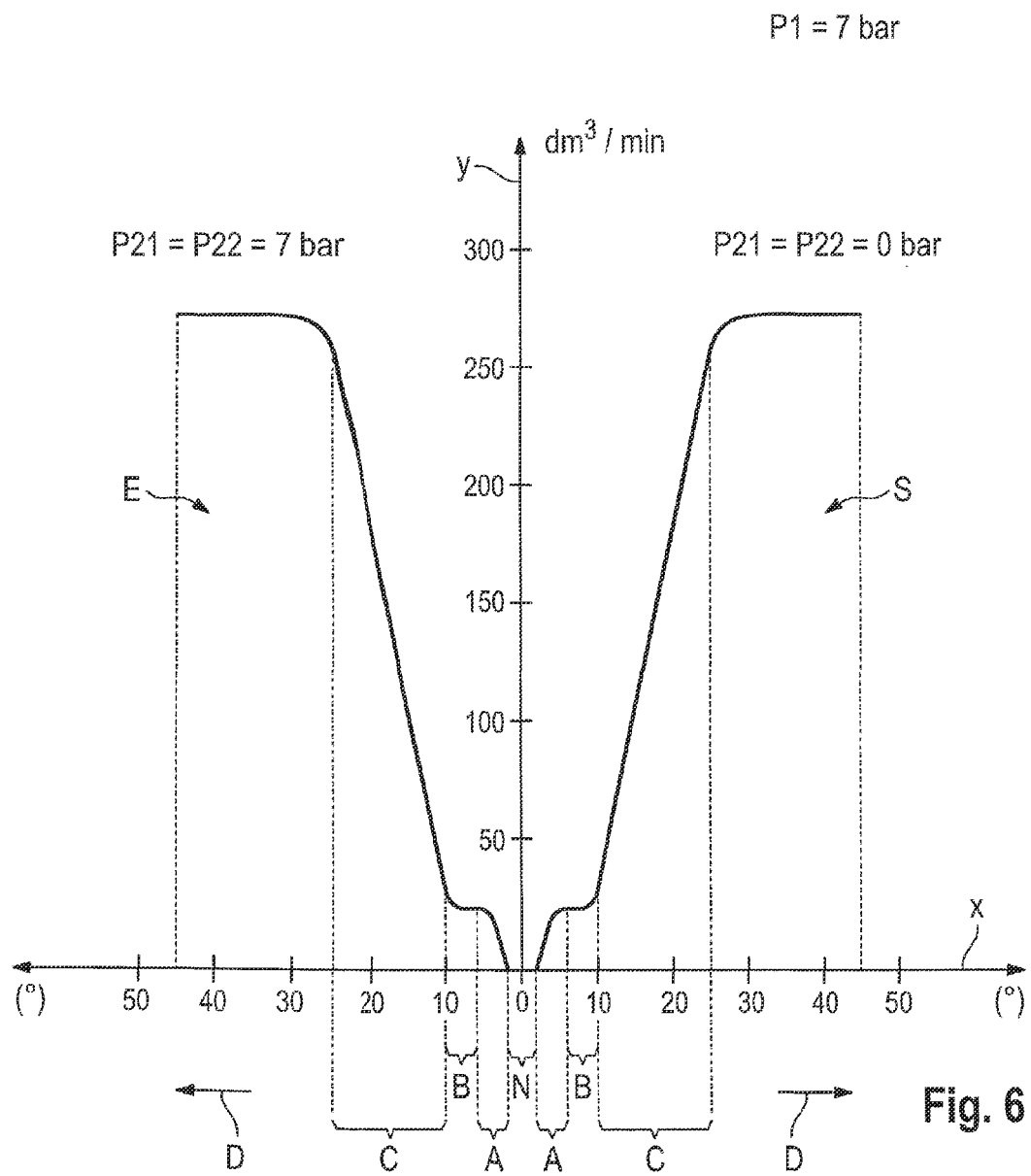
FIG. 6 is a schematic diagrammatic presentation of the characteristic flow curve of the leveling valve according to FIGS. 1 to 5.

The base body 141 of the housing 140 comprises a first fluid channel 21 at the end of which is located a connection port 142a for connecting the leveling valve 101 and, in particular, the first fluid channel 21, to a utilization element 205a of a vehicle (FIG. 6). Further, the base body 141 comprises a second fluid channel 22. At the end of the second fluid channel 22 there is a connection port 142b for connecting the leveling valve 101 to a second utilization element 205b. Utilization elements 205a,b may be, for example, pneumatic suspension bellows of a truck, where the first utilization element 205a might be a right side suspension bellow of the vehicle and the second utilization element 205b might be the left side suspension bellow, or vice-versa.

The fluid channels 21, 22 are connected to respective flow portions in the first valve disc 107 of the valve disc arrangement 103. The location and function of the flow portions inside the valve disc arrangement will be discussed hereinafter in connection with FIGS. 2-5.

The rotating portion 145 of the housing 140 comprises an external mounting section, which in FIG. 1 receives a lever 143 for operating the valve 101. The lever comprises at its (in FIG. 1) rightmost end portion a coupler 150 that engages a portion of the vehicle. Mechanical elements for translating a control motion from the vehicle to the valve 101 may be rollers, steering rods, etc. Upon actuation of the lever 143, the rotatable housing portion 145 is rotated relative to the base body 141 of the housing 140. The second valve disc 109 of the valve disc arrangement 103 is mounted non-rotatably with respect to the rotatable housing portion 145. Thus, upon actuation of the lever 143, the second valve disc 109 is rotated relative to the first valve disc 107 in this embodiment.

The base body 141 and the rotatable housing part 145, as well as the rotatable housing part 145 and the housing lid 148, are sealed against dirt ingress with one or more dirt seals 152. The first air plenum 154 is thus exposed to atmospheric pressure (cf. FIGS. 1a and 5).

The leveling valve 101 may optionally comprise a throttle 115a, 115b or 115c. FIG. 1 shows throttle 115a, which is formed as a flow passage in the shape of a conical bore in the base body 141, connecting the first and second fluid channels 21,22 with each other. Alternative locations for throttles are shown as well. There may be a throttle 115b formed in a contact surface between the first and second valve discs 107,109 (cf. throttle 115b in FIG. 2a, 2b). Alternatively, there may be a throttle 115c formed in a surface 108 of the first valve disc 107, the surface 108 being opposite the contact surface 111.

The fluid flow into and out of the leveling valve 101 of FIG. 1 are best seen from FIG. 1a. Most of the reference signs shown in FIG. 1a are also in FIG. 1, which is why in regard to these reference signs, explicit reference is made to FIG. 1.

The cross-section shown in FIG. 1a is a 90° rotation. The air flow into and out of leveling valve 101 is accomplished as explained hereinafter. The leveling valve 101 comprises in its base body 141 a fluid supply port 1. The fluid supply port 1 is in air-tight sealing contact with the first valve disc 107 and in fluid communication the first air passage 117 in the first valve disc 107. The fluid supply port 1 also comprises a connection port 142c similar to connection ports 142a,b shown in FIG. 1 leading to the utilization elements 205a,b. Connection port 142c is adapted for connection to a source 207 of pressurized air.

Through fluid supply port 1, pressurized air can be supplied through the first air passage 117 into the first flow portion 125 of the first valve disc 107 (FIG. 1). Depending on the angle of rotation of the second valve disc 109 relative to the first valve disc 107, air will be transported in fluid communication through the crosslink portion 137 of the second valve disc 109 to the second and third air passages 119, 121 in the first valve disc, and from there to the first and second fluid channels 21, 22, which lead towards the utilization elements 205a,b.

In the other switching scenario, air is being transported through the fluid channels 21, 22 and the second and third air passages 119, 121 of the first valve disc 107 into the second valve disc 109, through the second flow portion 127 in the second valve disc 109, and from there to the fourth air passage 123 in the first valve disc 107. The fourth air passage 123 in the first valve disc 107 is in fluid communication with a second air plenum 156. Also in fluid communication to the second air plenum 156 is an exhaust port 3 provided in the base body 141 of leveling valve 101. The exhaust port 3 is sealed against entry of air with an air flap 158, which opens if the pressure inside the second air plenum 156 is greater than the atmospheric pressure outside of valve 101.

The alternative throttle positions 115b,c shown in FIG. 1 have been omitted from FIG. 1a for an improved overview. The location of the alternative throttle position 115b,c can better be seen in FIGS. 2a,b and 3 and 3a.

The above disc arrangement 103 show FIGS. 1 and 1a is explained in more detail with reference to FIGS. 2, 2a and 2b. The valve disc arrangement 103 comprises the first valve disc 107 and the second valve disc 109. The orientation and arrangement shown in FIGS. 2, 2a and 2b corresponds to the arrangement of the valve discs 107, 109 when mounted inside the housing 140 of the valve 101. The First and second valve disc 107, 109 are arranged concentrically with respect to each other. The first valve disc 107 and the second valve disc 109 abut against each other with respective contact surfaces 111, 113, cf. FIGS. 3, 3a, 3b and 4, 4a, 4b.

Figure 2A:
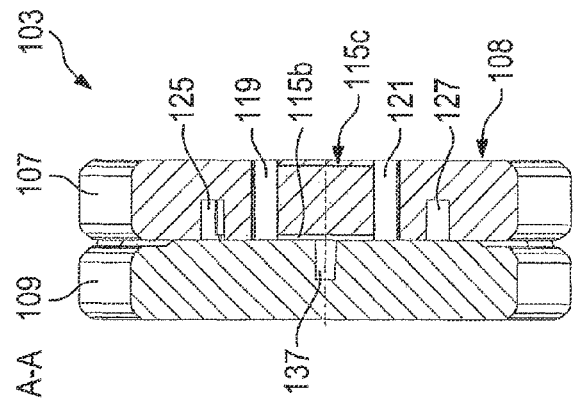
FIGS. 2a, 2b show different cross-sectional views of the valve disc arrangement shown in FIG. 2.
Figure 2:
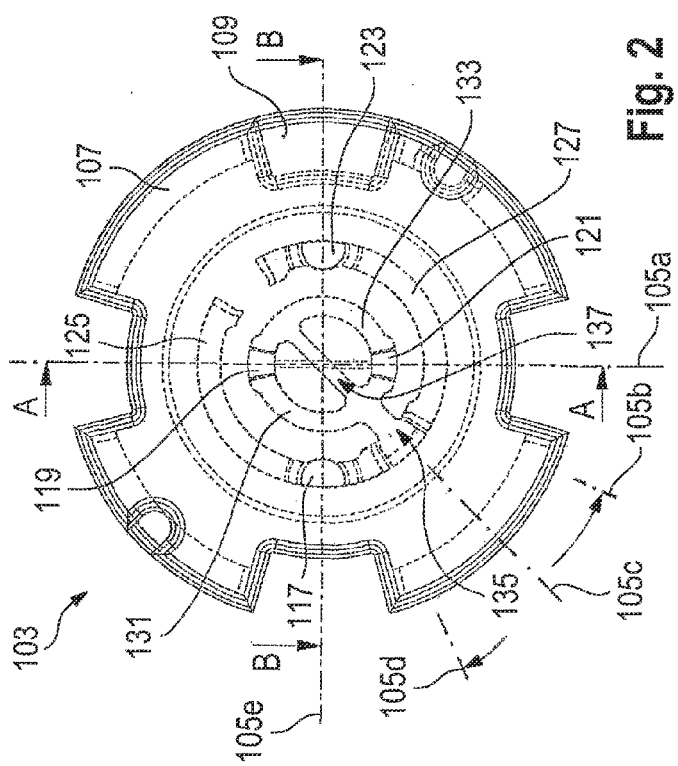
FIG. 2 is a side view of a valve disc arrangement of the leveling valve shown in FIG. 1.
Figure 5:
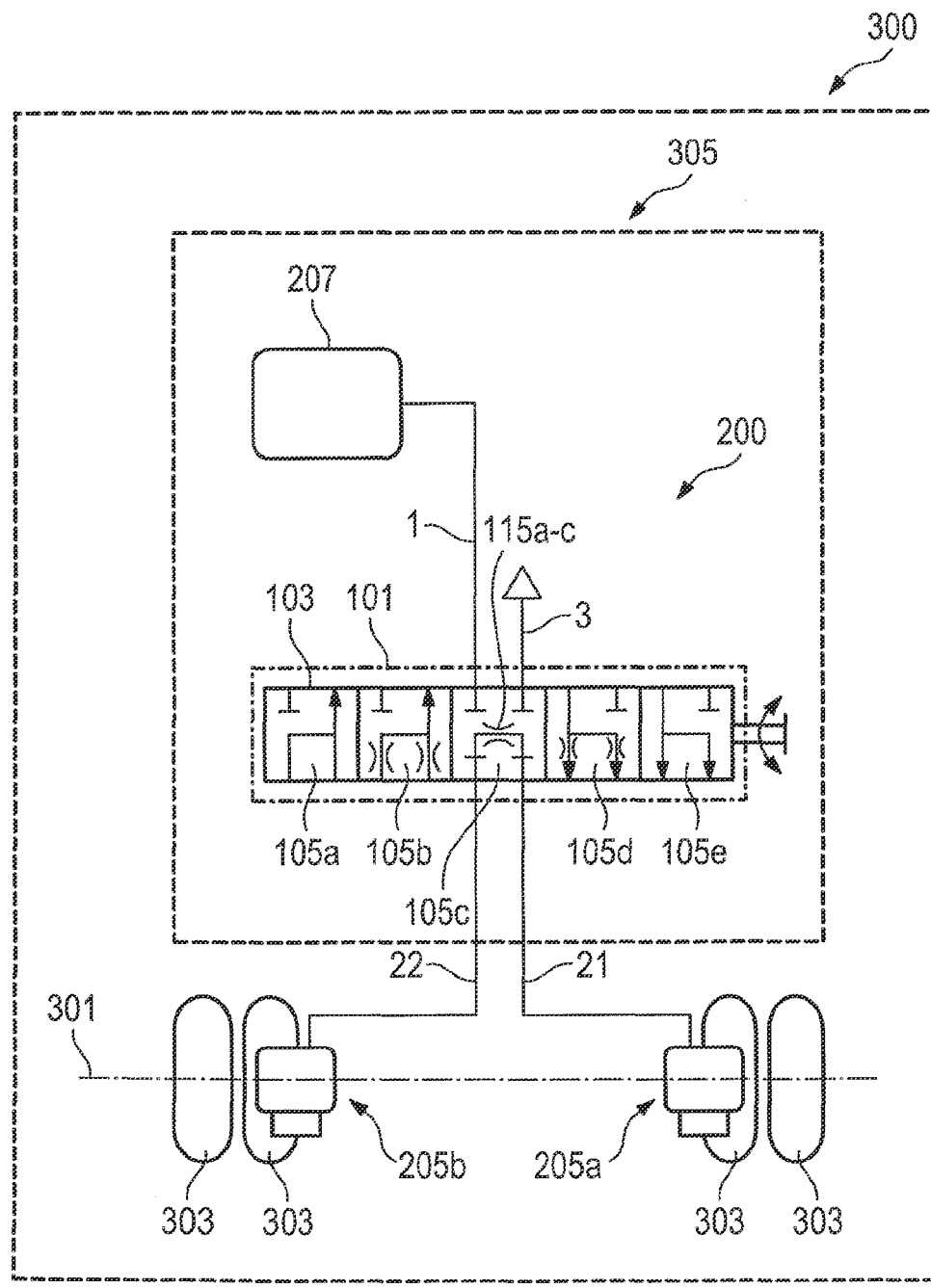
FIG. 5 is a schematic representation of a vehicle comprising the leveling valve according to FIGS. 1 to 4.

As can best be seen from FIGS. 2, 2a and b and 3, 3a, 3b, the first valve disc 107 has a substantially cylindrical shape and is substantially rotationally symmetric with respect to rotational center axis 136a. A number of recesses are formed in the periphery of the valve disc 107 to provide means for securing valve disc 107 to the housing 140 of valve 101. The first valve disc 107 comprises in its contact surface 111 a first air passage 117 for connection to the source 207 of pressurized air (FIG. 5). Further, the first valve disc 107 comprises a second air passage 119 for connection to a first utilization element 205a. Still further, the first valve disc 107 comprises a third air passage 123 for connection to a second utilization element 205b. The second and third air passages 119, 121 extend completely through the axial length of the valve disc 107. The first valve disc 107 further comprises a fourth air passage for connection to an air exhaust port 3. The first and fourth air passages 117, 123 extend completely through the axial length of the valve disc 107.

The first valve disc 107 may optionally comprise a number of first support ridges 138a-d (cf. FIG. 3b). Alternatively or additionally, the second valve disc may comprise a number of second support ridges 139a-e (cf. FIG. 4, 4b). The function of these first and/or second support ridges 138a-d, 139a-e is to enhance the stability of the abutment of the first and second valve discs 107,109 against each other such that higher forces and leverage can be absorbed and air-tight sealing can be improved between the contact surfaces 111,113 of the first and second valve discs 107,109.

As an extension of the first and fourth air passages 117, 123, the first valve disc 107 comprises in its contact surface 111 a first flow portion 125 connected to the first air passage 117, and a second flow portion 127 connected to the fourth air passage 123. These first and second flow portions 125, 127 are arcuate in shape, in particular circular, and arranged on the same radius with respect to each other and with respect to the rotational center axis of the valve disc. The flow portions are formed as recesses in the contact surface 111 and do not extend entirely through the axial length of the valve disc. The first and second flow portions 125, 127 are arranged to cooperate with the second valve disc for providing a given flow cross-section for each rotational alignment (switching position) of the first valve disc relative to the second valve disc.

The first flow portion 125 comprises on opposite ends first end portions 126a, 126b. These first end portions 126a,b are adapted and dimensioned to cooperate with an outer inlet/outlet portion 135 provided in the second valve disc 109 (cf. FIGS. 4, 4a, 4b).

In similar fashion to the first flow portion 125, the second flow portion 127 comprises on opposite ends second end portions 128a,b. Just like the first end portions 126a,b, the second end portions 128a,b are adapted and dimensioned to cooperate with the outer inlet/outlet portion 135 of the second valve disc (cf. FIGS. 4, 4*a*, 4*b*).

Within the area delimited by the air passages 117, 123 and first/second flow portions 125, 127, the second and third air passages 119, 121 are arranged. The second and third air passages 119, 121 are optionally linked in fluid communication by throttle 115*b* or throttle 115*c*. The throttle 115*b* is optionally formed as a small recess in the contact surface 111. The throttle 115*c* is optionally formed as a small recess in a surface 108 opposite the contact surface 111 of the first valve disc 107.

The depth of the throttle 115*b/c* as well as its width are significantly smaller than the depth and width of the first/second flow portions 125, 127 such that there is only very little mass flow between the second and third air passages 119, 121.

On opposing face sides of each first and second flow portion 125, 127, there is located a step 130*a-d*. The step 130*a-d* provides a retarded increase in flow cross-section.

The function of throttle 115*a-c* is to constantly allow-limited air exchange between the utilization elements 205*a,b* connected to the second and third air passages 119, 121. On the one hand, this serves to provide for pressure equilibrium in the plurality of utilization elements 205*a,b*. On the other hand, the limited cross-section of the throttle 115*a-c* prevents the utilization elements from over-expanding/over-compressing with regard to the respective other utilization element. This might, for example, be the case when one utilization element is aloft suspension bellow of a truck and the other utilization element is a right suspension bellow, and the truck drives at elevated speeds through long curves.

Between the first and second flow portions 125, 127 there is a respective dead space in the contact surface 111. This dead space is adapted to accommodate entirely an outer inlet/outlet flow portion 135 of a manifold 129 shown in FIGS. 4, 4*a*, 4*b*. This is discussed in more detail hereinafter.

The second valve disc 109 of the valve disc arrangement 103 is shown in FIGS. 4, 4*a* and 4*b*. The second valve disc 109 comprises a contact surface 113, which, when mounted inside the valve 101, faces and abuts against the contact surface 111 of the first valve disc 107. The second valve disc 109 is substantially rotationally symmetrical and cylindrical in shape with respect to rotational center axis 136*b*. In the periphery of the second valve disc 109, a number of recesses are formed to ensure securing and positioning of the second valve disc relative to the rotating housing portion 145 of the valve 101. In the contact surface, there is formed a manifold 129. The manifold comprises two arcuate manifold flow portions 131, 133. The arcuate manifold flow portions 131, 133 are preferably arranged on the same radius with respect to the rotational center axis 136*b*, and are circular in shape. The manifold flow portions 131, 133 are connected in fluid communication through a crosslink flow portion 137, which extends radially between the two flow portions 131, 133. As an extension to the crosslink flow portion 137 and extending outwards of the radius of the flow portions 131, 133, the manifold 129 comprises the outer inlet/outlet flow portion 135. From comparing FIG. 3 and FIG. 4, it becomes clear that the outer contour of the outer inlet/outlet flow portion 135 is congruently shaped with respect to the opposing face edges and outer contour of the first and second flow portions 125, 127 connected to the first air passage 117 and fourth air passage 123, respectively.

The crosslink flow portion 137 functions to constantly put manifold flow portions 131, 133 in fluid communication with each other. Thus, when the outer inlet/outlet flow portion 135 is in fluid communication with either the first air passage 117 or the fourth air passage 123 through either one of the first or second flow portions 125, 127 of the first valve disc 107, air will flow either from both the second and third air passages 119, 121 towards an exhaust port of the valve 101, or air will be supplied from the source of pressurized air through both the second and third air passages 119, 121 simultaneously.

Provided on opposite ends of the first arcuate manifold flow portion 131, there are formed respective end portions 132*a,b*. The end portions 132*a,b* are preferably dimensioned and adapted to respond with the shape of the second and third air passages 119, 121.

Similarly, the second arcuate manifold flow portion 133 comprises on its opposite end portions 134*a,b*, which are shaped in the same manner as the end portions 132*a,b*.

Between the end portions 132*b*, 134*a* and 132*a*, 134*b*, there is a dead space in the contact surface 113 of the second valve disc. The dead space is adapted to accommodate entirely the cross-section of the second and third air passages 119, 121 when the valve discs are in the neutral position 105*c* (cf. FIG. 2). The end portions as inner inlet/outlet flow portions 134*a,b* and 132*a,b* are located on each end of the arcuate manifold flow portions 131, 133. If the valve discs 107, 109 are rotated with respect to each other, the second and third air passages 119, 121 and the first and second manifold flow portions 131, 133 are brought into fluid communication with each other.

In a preferred embodiment, the dead space between the manifold flow portions 131, 133 in the second valve discs contact surface 113 are matched to the dead spaces between the first and second flow portions 125, 127 in the contact surface 111 of the first valve disc 107 such that, upon switching the valve, i.e., rotating the valve discs 107, 109 relative to each other, both the outer inlet/outlet flow portion 135 and the inner inlet/outlet flow portion 132, 134 are brought into fluid communication with the respective air passages.

As can best be seen from FIG. 4*b*, the contact surface 113 preferably comprises in its periphery a number of second support ridges 139*a,b,c,d,e*. Preferably, the height of the second support ridges 139*a-e* is flush with the inner portion of the contact surface 113 accommodating the manifold 129. This may, for example, be achieved by creating a planar surface 113 and then removing a centrally circular recess in between the inner portion of the contact surface and the peripheral region accommodating the second support ridges 139*a-e*.

Figure 2B:
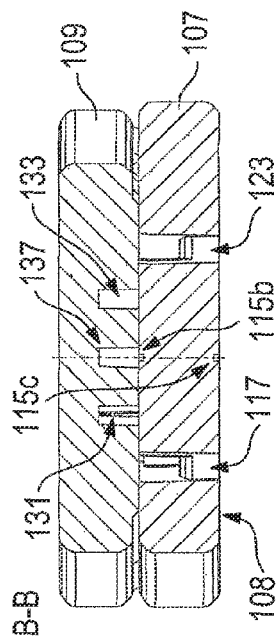

With continued reference to FIGS. 3 and 4, and looking back at FIGS. 2, 2*a* and 2*b*, the different switching positions of the valve disc arrangement 103 are explained in more detail. In FIG. 2, the orientation of the valve discs 107, 109 in the neutral position is given reference sign 105*c*. In this position, the outer inlet/outlet flow portion 135 is in the dead space between the first and second flow portions 125, 127 of the first valve disc 107. Similarly, the second and third air passages 119, 121 are in the dead space between the flow portions 131, 133 of the manifold 129 in the second valve disc 109.

If switched away from the neutral position 105*c*, e.g., by moving lever 143 shown in FIG. 1, the valve discs can be brought into an arrangement as indicated by reference sign 105*b*. In this switching position 105*b* (fifth switching position), the outer inlet/outlet flow portion 135 is in fluid communication with the second flow portion 127 and connected to air passage 123. The flow cross-section between the valve discs 107, 109 is however not yet maximized. If the rotation is continued from (fifth) switching position 105*b* onwards in the same direction, the next position reached, e.g., by further rotating the lever 143, will be (second) switching position 105a. In this position, the outer inlet/outlet flow portion 135 is in fluid communication with air passage 123 through second flow portion 127. Now, however, the cross-section established between the two valve discs 107,109 is maximized and larger than in the "throttled" fifth switching position 105b.

Alternatively, the valve may be switched away from the (third switching position) neutral position 105c shown in FIG. 2 in the other direction. If switched from the (third) neutral switching position 105c to a position 105d (fourth switching position), the outer inlet/outlet flow portion 135 is brought into throttled fluid communication with the first air passage 117 and the corresponding first flow portion 125. If the switching movement is continued until a (first) switching position 105e is reached, the throttle effect will again be minimized or deactivated. Because of the arcuate, preferably point-symmetric, design of the respective first and second flow portions 125,127 and first and second manifold flow portions 131 and 133, and the radially oriented crosslink portion 137 spanning this constellation, it also becomes clear that operation of the valve is also possible if the first and second valve disc are placed next to each other rotated by 180° clockwise or counterclockwise. This enables more flexible selection of the place of mounting the valve 101.

FIG. 5 shows an exemplary use of the valve 101 according to the embodiment of FIGS. 1 to 4. In particular, FIG. 5 schematically shows a vehicle 300. The vehicle 300 comprises an axle 301 supporting a number of tires 303. The tires 303 and the axle 301 are linked through an air suspension system 200 to a superstructure 305.

The air suspension system 200 comprises a plurality of utilization elements 205a,b such as pneumatic suspension bellows. The utilization elements 205a,b are functionally linked to the axle 301 and/or optionally directly to a single-tire support.

The utilization elements 205a,b are connected through a first fluid channel 21 and a second fluid channel 22 to the valve disc arrangement 103 of valve 101. Upon rotation of a lever, such as lever 143 of FIG. 1, the valve 101 can be brought into one of five switching positions 105a-e as explained hereinabove with respect to FIGS. 2 to 4. Depending on the switching position, air is transported from the utilization elements through the valve 101 to an exhaust port 3 (switching positions 105b "with throttle" or 105a "without throttle"). Alternatively, air can be supplied from a source 207 of pressurized air through fluid supply port 1 to the valve 101 and from thereon to the utilization elements 205a,b (position 105d "with throttle" and position 105e "without throttle").

In the diagrammatic representation of FIG. 6, the flow rate of air streaming through the valve is plotted against the angular rotation in degrees of the valve discs with respect to each other. Starting from a rotational angle of 0°, there is a first section N in which the valve remains in the neutral position. Upon exceeding the neutral position range, there is a first section A with comparatively steep increase in flow rate. In this section A, the respective inner and outer flow portions 132, 134, 135 of the manifold 129 are brought along their entire width in fluid communication with the congruently shaped and correspondingly aligned first and second flow portions 125, 127 and first and second manifold flow portions 131, 133. Next, due to the provision of steps 130a-d, or alternatively rounded edges or chamfers, the increase in flow rate becomes more shallow compared to the first section A in a section B. Towards higher degrees of rotation, the flow rate increase becomes steeper again and, in section C, the flow rate increase is substantially linear until approaching full opening of the flow cross-section, which is denominated by section D.

The part of the diagram to the right of FIG. 6, denominated S, is the flow characteristic of the "supply" switching positions. The left side of the diagram in FIG. 6, denominated E, is the "exhaust" switching position flow characteristic. Section N substantially corresponds to the neutral position 105c in FIG. 2.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A leveling valve for discharging air from and supplying air to utilization elements, the leveling valve comprising:
   a valve disc arrangement configured to direct air between a source of pressurized air, an exhaust port, and the utilization elements, the valve disc arrangement including:
      a first valve disc having a contact surface and at least one flow portion being a recess in the contact surface of the first valve disc; and
      a second valve discs having a contact surface and at least one inlet/outlet flow portion being a recess in the contact surface of the second valve disc,
   wherein the contact surface of the first valve disc contacts the contact surface of the second valve disc,
   wherein the first valve disc and the second valve disc are rotatable relative to one another such that the valve disc arrangement is switchable between multiple switching positions,
   wherein the multiple switching positions include a neutral position in which fluid communication between the utilization elements and both the source of pressurized air and the exhaust port is blocked, a discharge position in which a discharge flow path is provided allowing fluid communication between the utilization elements and the exhaust port, and a supply position in which a supply flow path is provided allowing fluid communication between the utilization elements and the source of pressurized air is provided, and
   wherein the first and second valve discs, when rotated relative to one another to switch the valve disc arrangement from the neutral position to one of the discharge position or the supply position, are configured to provide, respectively, the discharge flow path and the supply flow path,
   wherein rotation of the first and second valve disc relative to one another provides, between the neutral position and one of full opening of the discharge flow path and full opening of the supply flow path, a flow path cross-section that increases by varying rates of increase, the varying rates of increase being dependent on an angle of rotation between the valve discs.

2. The leveling valve according to claim 1, wherein at least one of the first and second valve discs comprises at least one of first and second support ridges abutting against the contact surface of the respective other of the first and second valve discs; and wherein at least one of the first and second support ridges is located in a radially peripheral region of the respective valve disc contact surface.

3. The leveling valve according to claim 1, wherein the utilization elements are pneumatic suspension bellows.

4. The leveling valve according to claim 1, wherein the at least one flow portion being a recess in the contact surface of the first valve disc has at least one end portion having a radial width and at least one middle portion having a radial width that is less than the radial width of the end portion.

5. The leveling valve according to claim 1, wherein a zero line at a center of the neutral position defines a state of zero rotation of the first valve disc relative to the second valve disc,
    wherein a rotation of approximately ±4-10 degrees from the zero line provides a first rate of increase of the flow path after which further rotation, for at least some range, provides a second rate of increase of the flow path that is less than the first rate of increase.

6. The leveling valve according to claim 1, wherein the flow portion of the first valve disc comprises a first section corresponding to a first rate of increase in flow path cross section, and a second section corresponding to a second rate of increase in flow path cross section different from the first rate of increase.

7. The leveling valve according to claim 6, wherein the second rate of increase is less than the first rate of increase.

8. The leveling valve according to claim 6, wherein the flow portion of the first valve disc comprises a third section corresponding to a third rate of increase in flow path cross section different from the second rate of increase.

9. The leveling valve according to claim 8, wherein the third rate of increase is higher than the second rate of increase.

10. The leveling valve according to claim 1, wherein at least one of the supply flow path and the discharge flow path comprises a throttle, the throttle being integrated in one of the valve disc arrangement and a housing of the leveling valve.

11. The leveling valve according to claim 10, the first valve disc further having a first air passage to the source of pressurized air, a second air passage to a first of the utilization elements, a third air passage to a second of the utilization elements, and a fourth air passage to the exhaust port.

12. The leveling valve according to claim 11, wherein the at least one flow portion being a recess in the contact surface of the first valve disc includes a first arcuate flow portion being a recess in the contact surface of the first valve disc and a second arcuate flow portion being a recess in the contact surface of the first valve disc.

13. The leveling valve according to claim 11, wherein the throttle is a flow channel connecting the second air passage and the third air passage.

14. The leveling valve according to claim 13, wherein the flow channel connecting the second air passage and the third air passage is one of (i) a recess in the contact surface of at least one of the first valve disc and the second valve disc, (ii) a recess in a surface opposite the contact surface of the first valve disc, and (iii) a flow passage inside a housing of the leveling valve.

15. The leveling valve according to claim 11, the second valve disc further having a manifold being a recess in the contact surface of the second valve disc, and
    wherein, depending which of the multiple switching positions the valve disc arrangement assumes, the manifold is in fluid communication with one of none and at least one of the first, second, third, and fourth air passages.

16. The leveling valve according to claim 15, wherein in the supply position, the manifold connects the first air passage to the second and third air passages,
    wherein in the discharge position, the manifold connects the fourth air passage to the second and third air passages, and
    wherein in the neutral position, the manifold does not connect either of the first or fourth air passages to the second and third air passages.

17. The leveling valve according to claim 15, wherein the manifold comprises first and second arcuate manifold flow portions respectively being recesses in the contact surface of the second valve disc,
    wherein the first and second manifold flow portions are configured to communicate, depending on which of the multiple switching positions the valve disc arrangement assumes, with the second and third air passages in the contact surface of the first valve disc.

18. The leveling valve according to claim 15, wherein an identical number of the multiple switching positions is provided when the second valve disc is rotated by about 180° in either direction with respect to the first valve disc.

19. A vehicle air suspension system, comprising:
    utilization elements;
    the leveling valve according to claim 1 for discharging and supplying air from and to the utilization elements; and
    a source of pressurized air connected to a first air passage of the leveling valve.

20. A vehicle, comprising:
    tires mounted on a vehicle axle;
    a superstructure; and
    the vehicle air suspension system according to claim 19, the air suspension system coupling the axle to the superstructure.

21. The vehicle air suspension system according to claim 19, wherein the utilization elements are pneumatic suspension bellows.

22. The leveling valve according to claim 1, wherein the at least one flow portion being a recess in the contact surface of the first valve disc has a depth that varies along a direction of rotation of the first valve disc relative to the second valve disc, and
    wherein the varying depth of the at least one flow portion of the first valve disc provides, at least in part, the varying rates of increase of the flow path cross section provided by rotation of the first and second valve discs relative to one another.

23. The leveling valve according to claim 22, wherein the at least one flow portion being the recess in the contact surface of the first valve disc has at least one end portion having a first depth and at least one middle portion having a second depth that is less than the first depth.

24. The leveling valve according to claim 23, wherein a variation in the radial width of the at least one flow portion of the first valve disc along a direction of rotation of the first valve disc relative to the second valve disc provides, at least in part, the varying rates of increase of the flow path cross section provided by rotation of the first and second valve discs relative to one another.

25. A leveling valve for discharging air from and supplying air to utilization elements, the leveling valve comprising a valve disc arrangement to direct air between a source of pressurized air, an exhaust port, and the utilization elements, the valve disc arrangement comprising first and second valve discs, the first and second valve discs being substantially concentric, contacting each other along respective contact surfaces, and being rotatable such that the valve disc arrangement is switchable between multiple switching positions, at least one of the multiple switching positions being a neutral position blocking fluid communication between the utilization elements and both the source of pressurized air and the exhaust port, and one of the source of pressurized air and the exhaust port being in fluid communication with the utilization elements in other of the multiple switching positions;

wherein the first and second valve discs, when switched from the neutral position, are configured to provide a stepped increase in flow cross-section in a respective flow path between one of the source of pressurized air and the exhaust port and the utilization elements, the stepped increase being dependent on an angle of rotation between the valve discs;

wherein the first valve disc comprises a first air passage to the source of pressurized air, a second air passage to a first of the utilization elements, a third air passage to a second of the utilization elements, and a fourth air passage to the exhaust port;

wherein the second valve disc comprises a manifold formed as a recess in the contact surface of the second valve disc facing the first valve disc, and wherein, depending on which of the multiple switching positions the valve disc arrangement assumes, the manifold is in fluid communication with one of none and at least one of the first, second, third, and fourth air passages;

wherein the manifold comprises first and second arcuate manifold flow portions respectively formed as a recess in the contact surface of the second valve disc facing the first valve disc, the first and second manifold flow portions being configured to communicate, depending on which of the multiple switching positions the valve disc arrangement assumes, with the second and third air passages in the contact surface of the first valve disc;

wherein the manifold comprises at least one of: (i) an outer inlet/outlet flow portion in fluid communication with the first and second manifold flow portions, the outer inlet/outlet flow portion being formed as a first recess in the contact surface of the second valve disc facing the first valve disc and configured to communicate with one of the first air passage and the fourth air passage in the first valve disc depending on which of the multiple switching positions the valve disc arrangement assumes; and (ii) first and second inner inlet/outlet flow portions on each end of the first and second manifold flow portions, the first and second inner inlet/outlet flow portions being formed as a second recess in the contact surface of the second valve disc facing the first valve disc and configured to communicate with the second and third air passages depending on which of the multiple switching positions the valve disc arrangement assumes; and wherein at least one of: (i) the outer inlet/outlet flow portion has a cross-sectional shape congruent with a corresponding cross-sectional shape of first and second end portions on ends of the first and second flow portions of the first and fourth air passages; and (ii) the first and second inner inlet/outlet flow portions respectively have a cross-sectional shape congruent with a corresponding cross-sectional shape of the second and third air passages.

26. The leveling valve according to claim 25, wherein at least one of the first and second end portions comprises at least one of a step, rounded edge, and chamfer.

27. A leveling valve for discharging air from and supplying air to utilization elements, the leveling valve comprising a valve disc arrangement to direct air between a source of pressurized air, an exhaust port, and the utilization elements, the valve disc arrangement comprising first and second valve discs, the first and second valve discs being substantially concentric, contacting each other along respective contact surfaces, and being rotatable such that the valve disc arrangement is switchable between multiple switching positions, at least one of the multiple switching positions being a neutral position blocking fluid communication between the utilization elements and both the source of pressurized air and the exhaust port, and one of the source of pressurized air and the exhaust port being in fluid communication with the utilization elements in other of the multiple switching positions;

wherein the first and second valve discs, when switched from the neutral position, are configured to provide a stepped increase in flow cross-section in a respective flow path between one of the source of pressurized air and the exhaust port and the utilization elements, the stepped increase being dependent on an angle of rotation between the valve discs;

wherein the first valve disc comprises a first air passage to the source of pressurized air, a second air passage to a first of the utilization elements, a third air passage to a second of the utilization elements, and a fourth air passage to the exhaust port;

wherein the second valve disc comprises a manifold formed as a recess in the contact surface of the second valve disc facing the first valve disc, and wherein, depending on which of the multiple switching positions the valve disc arrangement assumes, the manifold is in fluid communication with one of none and at least one of the first, second, third, and fourth air passages;

wherein in a first of the multiple switching positions, the manifold connects the first air passage to the second and third air passages, in a second of the multiple switching positions, the manifold connects the fourth air passage to the second and third air passages, and in a third of the multiple switching positions, the manifold is in neutral position connecting neither the first nor fourth air passages to the second and third air passages; and wherein, in a fourth of the multiple switching positions, the manifold connects the first air passage to the second and third air passages, wherein a flow cross-section between an outer inlet/outlet flow portion of the manifold and a first flow portion of the first air passage is smaller than in the first of the multiple switching positions, wherein in a fifth of the multiple switching positions, the manifold connects the fourth air passage to the second and third air passages, and wherein a flow cross-section between the outer inlet/outlet flow portion and a second flow portion of the fourth air passage is smaller than in the second of the multiple switching positions.

* * * * *